No. 607,547. Patented July 19, 1898.
P. W. PETERS.
COMBINED HORSE DETACHER AND WHEEL LOCK.
(Application filed Oct. 7, 1897.)
(No Model.) 2 Sheets—Sheet 1.

Witnesses,
Robert Everitt
L. B. Keefer

Inventor:
Perlai W. Peters.
By James L. Norris,
Atty.

No. 607,547. Patented July 19, 1898.
P. W. PETERS.
COMBINED HORSE DETACHER AND WHEEL LOCK.
(Application filed Oct. 7, 1897.)
(No Model.) 2 Sheets—Sheet 2.
Fig. 4.
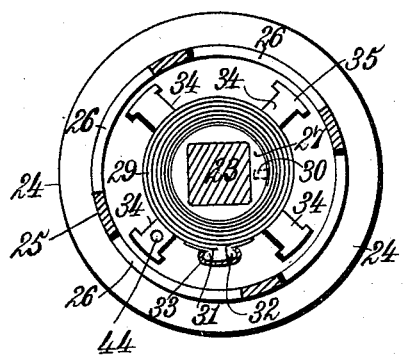
Fig. 5.
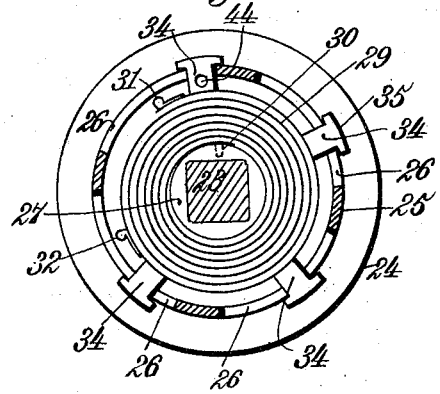
Fig. 6.
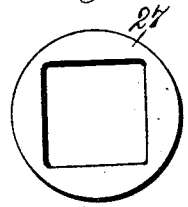
Fig. 7.
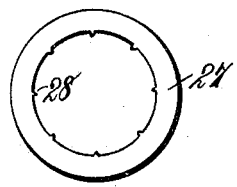
Fig. 8.
Witnesses.
Robert Everett,
F. B. Keefer.
Inventor.
Perlai W. Peters.
By James L. Norris
Atty.
THE NORRIS PETERS CO., PHOTO-LITHO., WASHINGTON, D. C.

UNITED STATES PATENT OFFICE.

PERLAI W. PETERS, OF WASHINGTON, DISTRICT OF COLUMBIA.

COMBINED HORSE-DETACHER AND WHEEL-LOCK.

SPECIFICATION forming part of Letters Patent No. 607,547, dated July 19, 1898.

Application filed October 7, 1897. Serial No. 654,446. (No model.)

*To all whom it may concern:*

Be it known that I, PERLAI W. PETERS, a subject of the Emperor of Germany, residing at Washington, in the District of Columbia, have invented new and useful Improvements in a Combined Horse-Detacher and Wheel-Lock for Vehicles, of which the following is a specification.

This invention relates to a combined horse-detacher and wheel-lock for vehicles, and has for its object to provide improved means under the control of the driver by means of which a runaway horse may be quickly detached from the vehicle and the vehicle-wheels simultaneously locked against rotation to bring the vehicle to a standstill.

To this end my invention consists in the novel features and in the construction, combination, and arrangement of parts hereinafter described, and particularly pointed out in the claims following the description, reference being had to the accompanying drawings, forming a part of this specification, wherein—

Figure 1:
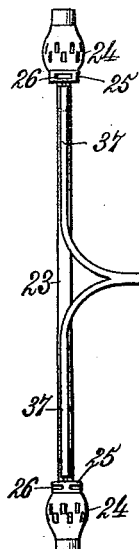
Figure 1:
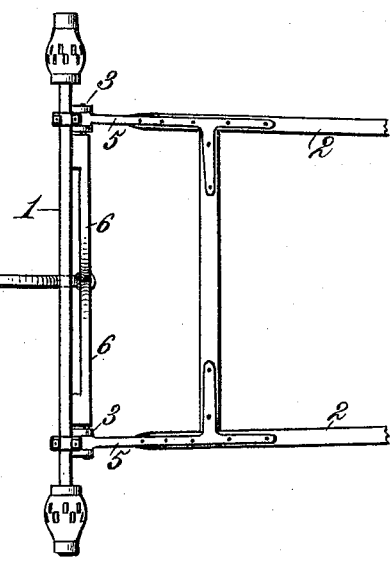
Figure 2:
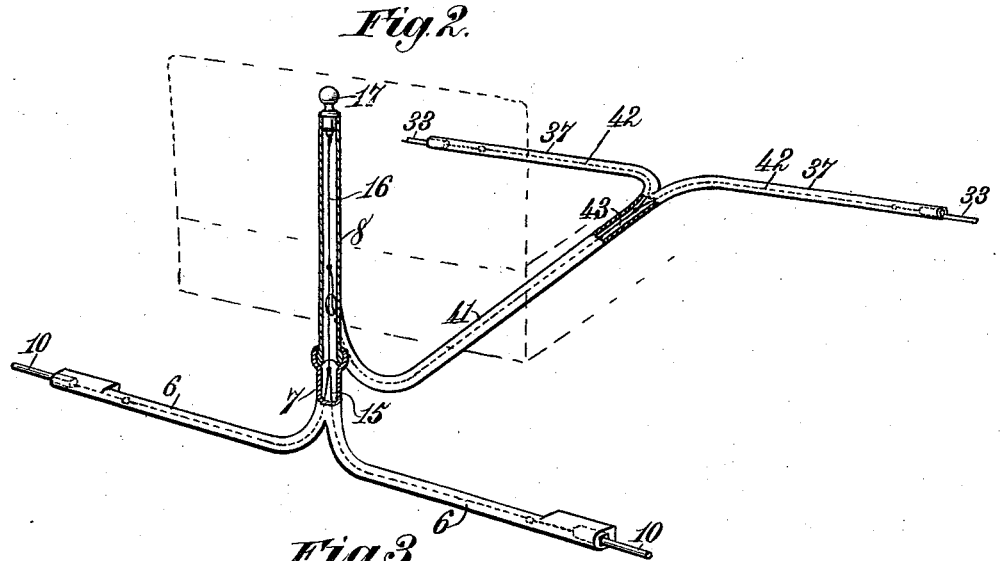
Figure 3:
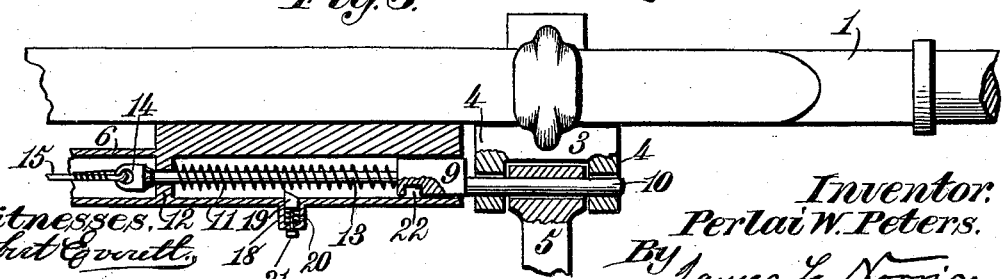

Figure 1 is a bottom plan view of the running-gear of a vehicle, showing my improved apparatus applied thereto. Fig. 2 is a perspective view, partially in section, of the guide-tubes in which are arranged the operating-cables. Fig. 3 is a detail sectional view of the means for detaching the shafts. Fig. 4 is a similar view of the wheel-locking mechanism. Fig. 5 is a transverse section taken through the line 5 5 of Fig. 4, illustrating the parts of the wheel-locking device in their normal position. Fig. 6 is a similar view showing the spring unwound and expanded and the locking-bolts in operating engagement with the hub-band. Fig. 7 is an end view of the axle-sleeve adapted for a square axle, and Fig. 8 is a similar view of a sleeve adapted for a round axle.

In the drawings I have shown my improved device applied to a buggy or analogous vehicle, and, referring to said drawings, the numeral 1 indicates the front axle of the vehicle, and 2 the shafts thereof.

To the front axle 1 are clipped thill-couplings 3 of ordinary and well-known construction, each having two perforated ears 4, between which is adapted to be fitted the thill-iron 5, which is also perforated, and the perforation in which is adapted to register with the perforations in the ears 4. Secured to the axle are two tubes 6, which are in alinement with each other and at their outer ends terminate adjacent to the thill-couplings 3 and register with the perforations in the ears 4 thereof. The inner ends of the tubes 6 are curved upward and are united to form a single upright extension 7, in which is swiveled the lower end of a vertical guide-tube 8, that is fixed to the front of the dashboard of the vehicle and extends up to or near the top thereof. Arranged in each of the outer ends of the tubes 6 is a plunger 9, which carries a coupling-pin 10, adapted to project through the perforations in the ears 4 and in the thill-iron and couple said parts together. The plunger 9 and coupling-pin 10 are held projected by a coiled spring 11, arranged in the tube 6 behind the plunger 9 and seated against a disk or shoulder 12, fixed in the tube 6.

It will be understood that the coupling mechanism above described is arranged at the outer end of each of the tubes 6. Projecting from the rear or inner ends of the plungers 9 are stems 13, which extend through suitable apertures in the disks 12 and are provided at their ends with eyes 14, to which are attached wire, cords, or chains 15, and which I shall hereinafter denominate "cables." The cables 15 pass through the tubes 6 and up into the vertical extension 7, where they are connected to a single cable 16, which passes up through the vertical tube 8, fixed to the dashboard, and at its upper end is connected to a knob 17, that normally rests on the upper end of the tube 8 in convenient reach of the driver.

By drawing on the knob 17 the cables 16 and 15 are drawn up within the tube and the plungers 9 drawn back within the tubes 6 against the action of the springs 11, thus retracting the coupling-pins 10 and detaching the shafts. The springs 11 normally hold the coupling-pins projected outward in operative engagement with the thill-couplings and thill-irons, and in order to hold them retracted to facilitate the attachment of the shafts to the vehicle I provide the following means: Fixed on the outer portion of each of the tubes 6 is a cylindrical cap 18, in which is arranged a beveled detent 19, that is adapted to be projected through a suitable aperture in the tube 6 by means of a coiled spring 20, disposed between the detent and the end of the cap. The detent is provided with a stem 21, that projects through the end of the cap and is provided with a knob adapted to be grasped by the fingers to retract the detent against the action of its spring. The plunger 9 is provided on one side with a recess or notch 22, which is engaged by the detent 19 when the plunger is retracted to withdraw the coupling-pin to detach the shafts and serves to hold the coupling-pin retracted until the shafts have been again placed in position, when the detents are disengaged by hand and the springs project the coupling-pins into coupling position.

In the event of the team running away it is released from the vehicle by detaching the shafts in the manner described, and the vehicle should then be brought to a standstill. In order to accomplish this result as speedily as possible without too sudden shock or jolt, I provide the following-described mechanism: Arranged on the rear axle and on the hubs of the rear wheels are spring locking mechanisms, and as the means for locking the wheels are exact duplicates one of the other a description of one will be sufficient. The numeral 23 indicates the rear axle, and 24 the hubs of the rear wheels. Fitted over the inner end of each of the hubs 24 is a metallic band or collar 25, which projects beyond the inner end of the hub, as most clearly shown in Fig. 4, and formed in its projecting portion is a plurality of elongated slots 26, for the purpose hereinafter made apparent. Fitted over the axle 23 is a sleeve 27, which, if the axle be square in cross-section, will be provided with a square aperture, as shown in Fig. 7, and will thus be held on the axle against rotation; but if the axle is round in cross-section then the sleeve 27 will be provided with a correspondingly-shaped aperture, as shown in Fig. 8, and in order to hold such sleeve against rotation on the axle I form it with a number of small internal ribs 28, which when the sleeve is forced over the axle indent themselves in the periphery of the axle and effectually prevent the sleeve from turning on the latter. Coiled about the sleeve 27 is a flat strong spring 29, which at its inner end is rigidly attached to the sleeve by means of a screw, bolt, rivet, or other suitable means, as indicated at 30. The outer end of the spring is provided with a cylindrical projection or knurl 31, while a similar knurl 32 is suitably fixed to the outer convolution of the spring at such a point that when the spring is tightly wound up on the sleeve the knurls 31 and 32 are brought into juxtaposition, and when in this position are adapted to be embraced or engaged by an approximately U-shaped clip 33, more fully hereinafter described, which operates to hold the spring wound up. Rigidly attached to the outer convolution of the spring 29 is a plurality of stops 34, one for each slot 26 in the hub-band 25 and each provided with a T-shaped head 35, which when the spring is released and uncoils is projected outward through its corresponding slot in the hub-band and hooks over or engages the periphery of the latter. The slots 26 in the band 25 are considerably longer than the T-heads 35 of the stops, whereby when the stops are thrown outward by the spring one or the other of said stops are certain to be projected through a slot 26 and engage the band.

Each of the clips 33 is firmly attached to a plunger 36, which is arranged in the outer end of a guide-tube 37 and is projected outward and held in engagement with the knurls 31 and 32 of the spring 29 by a coiled spring 38. A detent 39 is arranged to engage a notch or recess 40 in the plunger and hold the clip in its retracted position. The construction referred to is precisely the same as that before described in connection with the coupling-pins 10 and need not be further explained. The two tubes 37 are clipped to the under side of the axle and at their inner ends are curved forward toward each other and terminate in a single guide-tube 41, which extends horizontally forward beneath the vehicle to near the front axle, where it is curved upward and is joined to and communicates with the guide-tube 8, fixed to the dashboard, as most clearly shown in Fig. 2. Cables 42 are attached to the stems of the plungers 36 and pass through the guide-tubes and into the guide-tube 41, where they are connected to a single cable 43, disposed in the guide-tube 41 and attached at its other end to the cable 16 in the guide-tube 8.

It will be evident that by drawing upon the cable 16 the plungers 36 will be retracted through the medium of the cables 43 and 37, and the clips 33 will be thus disengaged from the knurls 31 and 32 of the springs 29 and will release the latter. As soon as the springs are released they will uncoil, and in uncoiling will expand and throw outward the stops 34 through the slots in the hub-band. The forward movement of the vehicle will then again wind up the springs until they can be wound no tighter, when the wheels will be prevented from turning farther and the vehicle be thus brought to a standstill. It will be manifest that when the springs are first released the wheels will be permitted to turn with but little resistance, but as the springs are wound tighter and tighter by the rotation of the wheels the resistance offered to their rotation will be gradually increased until the springs are fully wound up and the wheels locked.

When it is desired to restore the locking mechanisms to their normal positions, the springs may be unwound by moving the vehicle backward a short distance until the springs are relaxed sufficiently to disengage the stops from the hub-band, when the springs may be wound up by hand by means of knobs 44, attached to the stops fixed on the ends of the springs, and then held in their wound positions by releasing the detents 39 and causing the clips 33 to engage the knurls 31 and 32, as before described. The locking mechanisms are then in position for further use when the occasion may arise.

I have described the operation of the horse-detaching and wheel-locking mechanisms separately, but it will be readily understood that they operate conjointly and simultaneously, for when the team runs away and the knob 17 is lifted both the cables 15 and 17 will be drawn upon, and hence at the same time the coupling-pins 10 are withdrawn to release the shafts the clips 33 will be retracted to release the springs 29, whereby the horse will be released and the rotation of the wheels be at first retarded and finally brought to a state of complete rest by one and the same operation.

By swiveling the guide-tubes 7 and 8 together by a ball-and-socket joint, as shown, the front axle is not only free to turn, but the body of the vehicle is free to rock on the axle without disarranging any of the parts.

I have shown the invention applied to a buggy having shafts, but it will be manifest that it may be applied to vehicles of every description, and that it may be used in connection with a vehicle tongue or pole equally as well as with shafts.

Having described my invention, what I claim is—

1. The combination with the vehicle-axle, of a helical spring wound thereon and fixed thereto at its inner end, a knurl carried by the free end of the spring, a similar knurl fixed on the outer convolution of the spring and arranged to be brought into juxtaposition to the knurl on the end of the spring when the latter is wound up, a clip constructed to embrace said knurls and hold the spring in its wound position, a stop carried by the outer convolution of the spring, a band fixed on the hub and provided with a slot through which the said stop is projected when the spring is unwound and expands, and means under the control of the occupant of the vehicle for disengaging said clip from the knurls to release the spring, substantially as described.

2. The combination with the vehicle-axle, of a helical spring wound thereon and fixed thereto at its inner end, a knurl carried by the free end of the spring, a similar knurl fixed on the outer convolution of the spring and arranged to be brought into juxtaposition to the knurl on the end of the spring when the latter is wound up, a clip constructed to embrace said knurls and hold the spring in its wound position, a plurality of stops carried by the outer convolution of the spring, a band fixed on the hub and provided with a plurality of elongated slots through which the said stops are projected when the spring is unwound and expands, and means under control of the occupant of the vehicle for disengaging said clip from the knurls to release the spring, substantially as described.

3. The combination with the vehicle-axle, of a sleeve fixed against rotation thereon, a helical spring coiled about said sleeve and attached thereto at its inner end, a knurl carried by the free end of the spring, a similar knurl fixed on the outer convolution of the spring and arranged to be brought into juxtaposition to the knurl on the end of the spring when the latter is wound up, a clip constructed to embrace said knurls and hold the spring in its wound position, a plurality of stops carried by the outer convolution of the spring, a band fixed on the inner end of the hub and projecting over said sleeve, said sleeve being provided with a plurality of elongated slots through which the said stops are projected when the spring is unwound and expands, and means under the control of the vehicle for disengaging said clip from the knurls to release the spring, substantially as described.

4. The combination with the vehicle-axle, of a helical spring coiled thereon and connected thereto at its inner end, a knurl carried by the free end of the spring, a similar knurl fixed on the outer convolution of the spring and arranged to be brought into juxtaposition to the knurl on the end of the spring when the latter is wound up, a clip constructed to embrace said knurls and hold the spring in its wound position, a plurality of stops carried by the outer convolution of the spring and each provided with a T-shaped head, a band fixed on the hub and provided with a plurality of elongated slots through which the said stops are projected when the spring is unwound and expands, and means under control of the occupant of the vehicle for disengaging said clip from the knurls to release the spring, substantially as described.

5. The combination with the vehicle-axle, of a helical spring wound thereon and fixed thereto at its inner end, a knurl carried by the free end of the spring, a similar knurl fixed on the outer convolution of the spring and arranged to be brought into juxtaposition to the knurl on the end of the spring when the latter is wound up, a clip constructed to embrace said knurls and hold the spring in its wound position, a plurality of stops carried by the outer convolution of the spring, a band fixed on the hub and provided with a plurality of elongated slots through which the said stops are projected when the spring is unwound and expands, a spring for holding said clip in engagement with the knurls, means under control of the occupant of the vehicle for disengaging said clip from the knurls to release the spring, and means for holding said clip in its disengaged position, substantially as described.

6. The combination with the vehicle-axle, of a helical spring wound thereon and connected thereto at its inner end, means for holding said spring wound up, a plurality of stops carried by the outer convolution of the spring and provided with T-shaped heads, a band fixed on the hub and provided with a plurality of elongated slots through which the said stops are projected when the spring is unwound and expands, and means under control of the occupant of the vehicle for releasing said spring to permit it to uncoil and expand to throw said stops into engagement with the hub-band, substantially as described.

7. The combination with the vehicle-axle, of a helical spring wound thereon and fixed thereto at its inner end, a knurl carried by the free end of the spring, a similar knurl fixed on the outer convolution of the spring and arranged to be brought into juxtaposition to the knurl on the end of the spring when the latter is wound up, a U-shaped clip constructed to embrace said knurls and hold the spring in its wound position, a plurality of stops carried by the outer convolution of the spring, a band fixed on the hub and provided with a plurality of elongated slots through which the said stops are projected when the spring is unwound and expands, and means under control of the occupant of the vehicle for withdrawing said clip longitudinally from over said knurls to release the spring, substantially as described.

8. The combination with the vehicle-axle, of a helical spring wound thereon and connected thereto at its inner end, means for holding said spring wound up, a plurality of stops carried by the outer convolution of the spring and provided with T-shaped heads, a band fixed on the hub and provided with a plurality of elongated slots through which the said stops are projected when the spring is unwound and expands, means for detachably connecting the shafts to the vehicle, and means under the control of the driver for releasing the shaft-detaching mechanism and simultaneously releasing the said spring to permit it to uncoil and expand to throw said stops into engagement with the hub-band, substantially as described.

9. The combination with the vehicle-axle, of helical springs wound on the opposite ends thereof and connected thereto at their inner ends, means for holding said springs wound up, a series of stops carried by the outer convolutions of the springs, bands fixed on the hubs and provided with elongated slots through which the said stops are projected when the springs are unwound and expand, guide-tubes supported on the axle and connected at their adjacent ends to a single guide-tube which at its forward end is curved upward and connected to a vertical tube fixed on the vehicle-body, and cables disposed in said tubes and connected to the spring-controlling mechanisms, said cables being under the control of an occupant of the vehicle for releasing the springs, substantially as described.

10. The combination with a vehicle, of means for detaching the shafts therefrom and mechanism for locking the rear wheels, of guide-tubes 6 supported on the front axle and terminating in an upward extension 7, a vertical tube 8 attached to the dashboard and swiveled on the extension 7, a longitudinal guide-tube 41 connected at its front end to the tube 8 and terminating at its rear end in two tubes 37 supported on the rear axle, cables disposed in the tubes 6 and 37 and respectively connected to the shaft-detaching and wheel-locking mechanism and connected to a cable in the tube 8, and means carried by the last-named cable in convenient reach of an occupant of the vehicle for operating the cables to detach the shafts and lock the wheels, substantially as described.

11. The combination with the front axle of a vehicle, of thill-couplings attached thereto and having perforated ears 4, the thill-irons 5 arranged between said ears, tubes 6 attached to the axle in alinement with said ears, said tubes at their adjacent ends terminating in a single upright tube 7, a vertical tube 8 attached to the dashboard and connected to the tube 7 by a universal joint, plungers 9 arranged in the outer ends of the tubes 6 and carrying coupling-pins 10 adapted to project through the perforations in the ears and coupling-pins to couple said parts together, springs 11 for ejecting said plungers, cables 15 disposed in the tubes 6, and a cable 16 disposed in the tube 8, said cable 16 being attached at one end to the cables 15 and provided at its other end with a knob 17, substantially as described and for the purpose specified.

In testimony whereof I have hereunto set my hand in presence of two subscribing witnesses.

PERLAI W. PETERS.

Witnesses:
JAMES L. NORRIS,
F. B. KEEFER.